United States Patent [19]
Walters et al.

[11] Patent Number: 5,388,445
[45] Date of Patent: Feb. 14, 1995

US005388445A

[54] METHOD FOR DETERMINING ARRIVAL AND AMPLITUDE OF A WAVE FRONT AND APPARATUS THEREFOR

[75] Inventors: Gregg D. Walters, Sunnyvale; James B. Jerde, Scotts Valley, both of Calif.

[73] Assignees: NKK Corporation, Tokyo, Japan; Digital Dynamics, Inc., Scotts Valley; H. L. Legdeen Associates, Sun Valley, both of Calif.

[21] Appl. No.: 962,524

[22] Filed: Oct. 16, 1992

[51] Int. Cl.$^6$ .............................................. G01M 3/28
[52] U.S. Cl. .................................................. 73/40.5 R
[58] Field of Search ................... 73/40, 40.5 R, 49.1, 73/49.5, 37, 592

[56] References Cited

U.S. PATENT DOCUMENTS

| | | |
|---|---|---|
| 3,851,521 | 12/1974 | Ottenstein . |
| 3,903,729 | 9/1975 | Covington . |
| 4,012,944 | 3/1977 | Covington et al. . |
| 4,091,658 | 5/1978 | Covington et al. . |
| 4,144,743 | 3/1979 | Covington et al. . |
| 4,198,855 | 4/1980 | Tsujikara ............... 73/40.5 R |
| 4,651,559 | 3/1987 | Horigome et al. ........ 73/40.5 R |
| 4,796,466 | 1/1989 | Farmer . |

FOREIGN PATENT DOCUMENTS

| | | | |
|---|---|---|---|
| 0042212A1 | 5/1981 | European Pat. Off. . | |
| 0100730 | 6/1983 | Japan ................ | 73/40.5 R |
| 0109237 | 4/1989 | Japan ................ | 73/49.5 |
| 0147931 | 6/1990 | Japan ................ | 73/40.5 R |
| 0147932 | 6/1990 | Japan ................ | 73/40.5 R |

OTHER PUBLICATIONS

Brochure titled "Introducing the Pressure Watch", published Jun., 1989.
"Line Break Detection and Testing Method", Y. S. Chan, a paper presented Oct. 16-17, 1980 at Pipeline Simulation Interest Group (PSIG).
"Wavealert, a new technological breakthrough that detects a pipeline leak sooner rather than later", 1980.
"Pipeline leak detection techniques" by N. C. Butler, pp. 24–29 in Journal of Pipes & Pipelines International, vol. 27, No. 2, Apr. 1982.

*Primary Examiner*—Hezron E. Williams
*Assistant Examiner*—Rose M. Pinley
*Attorney, Agent, or Firm*—Frishauf, Holtz, Goodman & Woodward

[57] ABSTRACT

A time of arrival of a pressure wave front travelling through fluid in a pipeline due to an event which causes fluctuation of pressure in such fluid is determined. The characteristic related to the pressure of the fluid is measured at a given position along the pipeline. A rate of change of the fluid pressure is determined for each measured pressure value by calculating a straight line derived from a plurality of such pressure values. The slope of the current straight line is compared to a threshold derived from a plurality of slopes obtained for previous pressure values, and a signal is outputted when the slope exceeds the threshold. Such signal is indicative of the time of arrival of the pressure wave front. The time of arrival is utilized to obtain the magnitude of the event, the location on the pipeline at which the event occurred, and its time of occurrence.

52 Claims, 6 Drawing Sheets

METHOD FOR DETERMINING ARRIVAL AND AMPLITUDE OF A WAVE FRONT AND APPARATUS THEREFOR

RELATED APPLICATIONS

"Method for determining Direction of Travel of a Wave Front and Apparatus Therefor", U.S. Ser. No. 07/962,526 filed concurrently herewith, and "Method for Locating a Pressure Transient Source in a Pipeline and Apparatus Therefor", U.S. Ser. No. 07/962,457 filed concurrently herewith.

BACKGROUND OF THE INVENTION

The present invention relates to a method and an apparatus for detecting a wave front caused by the onset of leaks or other transient events in a pipeline and, more particularly, to a method and an apparatus for making use of measurements of the pressure of a fluid in the pipeline to determine the arrival time and/or amplitude of the wave front.

It has been long known that most pipeline operational events such as operation of valves, start-up or shutdown of pumps, or a break in the pipeline can result in a sudden pressure change at the location of the event. This pressure transient immediately forms a pressure wave which travels both up-stream and down-stream at the speed of sound in the fluid flowing in the pipeline. Were it not for the fact that pipelines typically are highly turbulent, energetic, dynamic systems with continuously changing pressure conditions, these pressure events could be easily detected and used by pipeline operators to confirm commanded operations of valves or pumps, or to detect undesired leaks or surges.

Because of the significant amount of randomly generated pressure noise found in most pipelines, the use of the leading edge of a pressure wave (i.e. a wave front) has typically been unsuccessful or impractical. It is highly useful to detect the wave front. For example, the time of its arrival at a detector can be used to determine the location of an event along the pipeline which caused the pressure wave. The derived location can be correlated against apparatus on the pipeline to confirm occurrence of desirable operations, such as that of a valve, or to locate a leak so that appropriate remedial action can be taken. One way of computing the location from such time of arrival is disclosed in U.S. Pat. No. 3,851,521 issued to Ottenstein. Amplitude data on the wave front can also be derived. This is valuable for providing an indication as to the size of a leak caused by a break in the pipeline so that a decision can be made on the nature and urgency of the required remedial action. Furthermore, the location of the event can also be determined from the amplitude. One way of computing the location from such amplitude is disclosed in EPO published application no. 0 042 212.

Examples of prior art methods intended to detect arrival of the wave front are disclosed in U.S. Pat. Nos. 4,144,748, 4,091,658 and 4,012,944 issued to Covington and in U.S. Pat. No. 4,796,466 issued to Farmer. The inventors of these prior art approaches found that the leading edge of the pressure drop signals was too difficult to reliably detect when obscured by the turbulent background pressure noise and, therefore, they chose to heavily filter the pressure signals until a significant trend in the pressure signal profile which follows the leading edge could be established.

The application of a single filter, such as the electrical integrator of Covington or the statistical filter of Farmer, eliminates some noise and can help identify a trend. However, when these filters are set to time constants long enough to be useful (e.g. an upper cutoff frequency of 5 Hz), they also destroy all evidence of the leading edge of the wave front by averaging these rapidly changing pressures into slowly changing values. This makes it virtually impossible to accurately determine the arrival time and amplitude of the passing wave front.

SUMMARY OF THE INVENTION

An object of the present invention is to reliably detect a significant wave front travelling in the high noise environment characteristic of pipelines, and to accurately measure its amplitude and time of arrival.

This and other objects are attained in accordance with one aspect of the invention directed to a method for determining at a given position on a pipeline a time of arrival of a pressure wave front travelling through fluid in the pipeline due to an event which causes fluctuation of pressure in such fluid by measuring at the given position a characteristic related to the pressure of the fluid, and deriving therefrom pressure values corresponding to respective discrete times occurring during an interval of time. A selection is made of a first duration of a time window within such time interval which encompasses a plurality of the pressure values, and relating the derived pressure values to respective time windows, this first duration being such that a multiplicity of time windows are included within the time interval. For each of the pressure values upon its being derived as a current value, a rate of change of fluid pressure with time is approximated by a slope of a current straight line, such slope being derived from the plurality of pressure values in the time window related to the current value. The measured characteristic is converted to a signal indicative of the time of arrival of the pressure wave front by comparing the slope of the current straight line to a threshold derived from a plurality of slopes obtained for previous time windows within the time interval, and outputting the signal indicative of the time of arrival of the pressure wave front based upon the slope of a first current straight line exceeding the threshold.

Another aspect of the invention is directed to a method for determining at a given position on a pipeline a time of arrival of a pressure wave front travelling through fluid in the pipeline due to an event which causes fluctuation of pressure in such fluid by measuring at the given position a characteristic related to the pressure of the fluid, and deriving therefrom a set of pressure values corresponding to respective discrete times. A subset of a plurality of the pressure values is selected, and the derived pressure values are related to respective subsets, these subsets being such that a multiplicity thereof are included within the set. For each of the pressure values, upon its being derived as a current value, a rate of change of fluid pressure with time is approximated by a slope of a current straight line derived from the plurality of pressure values in a subset specifically related to the current value. The measured fluid pressure characteristic is converted to a signal indicative of the time of arrival of the pressure wave front by comparing the slope of the current straight line to a threshold derived from a plurality of slopes obtained for previous subsets, and the signal indicative of the time of arrival of the pressure wave front is outputted based upon the slope of a current straight line exceeding the threshold.

An additional aspect of the present invention is directed to a method of detecting a wave front indicative of a transient event occurring in a pipeline by measuring a characteristic related to pressure of a fluid in the pipeline with a measuring device positioned at a given point on the pipeline, and outputting analog signals proportional to the pressure. The analog signals are converted into digital signals. The digital signals are saved in a pressure history. The digital signals received during a short time window within the pressure history are selected, and the pressure against time relationship of the received digital signals is approximated by a current straight line, a new current straight line being calculated as each pressure measurement is received. The slopes of the current straight lines are saved in a slope history, the slope history being longer in time than the short time window. A mean and a standard deviation of all of the slopes in the slope history are derived. When the slope of a new current straight line deviates from said mean of the slopes in the slope history by a deviation of more than a specified multiple of said standard deviation of the slopes in the slope history, this condition is detected and the time of this detected deviation is outputted as a first signal indicative of an arrival time of the wave front at the given point. Further signals are selected from the pressure history that fall within a reference time window which precedes the deviation, and the pressure against time relationship of the digital signals in said reference time window is approximated by a reference straight line. The end of the transient event is found by repeating the above-described steps until the slope of a new current line returns to a designated slope. A pressure difference between the reference line and the current line the slope of which returned to the designated slope is derived, and this derived pressure difference is outputted as a second signal indicative of an amplitude of the wave front. The first signal is rejected as being caused by an event if the second signal is indicative of an amplitude below a specific threshold selected as indicative of noise.

A further aspect of the present invention is directed to a method for determining an arrival time and amplitude of a pressure wave front travelling through fluid in a pipeline due to an event which causes fluctuation of pressure in such fluid by measuring a characteristic related to the pressure of the fluid in the pipeline, converting measurements of the characteristic to electric signals, obtaining from these signals an indication of wave front arrival, and responsive to such indication, determining the arrival time and amplitude of the wave front by means of statistical processing.

Still another aspect of the present invention is directed to an apparatus for determining at a given position on a pipeline a time of arrival of a pressure wave front travelling through fluid in the pipeline due to an event which causes fluctuation of pressure in such fluid with means for measuring at the given position a characteristic related to the pressure of the fluid, and deriving from the measured characteristic pressure values corresponding to respective discrete times occurring during an interval of time. Another means selects within such time interval a first duration of a time window encompassing a plurality of the pressure values, and relates the derived pressure values to respective time windows, the first duration being such that a multiplicity of time windows are included within the time interval. A means is provided for approximating, for each of the pressure values, upon its being derived as a current value, a rate of change of fluid pressure with time by a slope of a current straight line derived from the plurality of pressure values in the time window related thereto. A further means is provided for converting the measured characteristic to a signal indicative of the time of arrival of the pressure wave front by comparing the slope of the current straight line to a threshold derived from a plurality of slopes obtained for previous time windows within the time interval, and outputting the signal indicative of the time of arrival of the pressure wave front based upon the slope of a first current straight line exceeding the threshold.

Yet another aspect of the present invention is directed to an apparatus for determining at a given position on a pipeline a time of arrival of a pressure wave front travelling through fluid in the pipeline due to an event which causes fluctuation of pressure in such fluid with means for measuring at the given position a characteristic related to the pressure of the fluid, and deriving from the measured characteristic a set of pressure values corresponding to respective discrete times. Another means selects a subset of a plurality of the pressure values, and relating the derived pressure values to respective subsets, these subsets being such that a multiplicity thereof are included within the set. A means is provided for approximating, for each of the pressure values, upon its being derived as a current value, a rate of change of fluid pressure with time by a slope of a current straight line derived from the plurality of pressure values in a subset specifically related to the current value. A further means converts the measured fluid pressure characteristic to a signal indicative of the time of arrival of the pressure wave front by comparing the slope of the current straight line to a threshold derived from a plurality of slopes obtained for previous subsets, and outputs this signal indicative of the time of arrival of the pressure wave front based upon the slope of a current straight line exceeding the threshold.

An additional aspect of the present invention is directed to an apparatus for detecting a wave front indicative of a transient event occurring in a pipeline with means for measuring a characteristic related to pressure of a fluid in the pipeline with a measuring device positioned at a given point on the pipeline, and outputting analog signals proportional to the pressure. A means is provided for converting the analog signals into digital signals. Another means saves the digital signals in a pressure history. The means for selecting the digital signals received during a short time window within the pressure history are selected by a means which approximates the pressure against time relationship of the received digital signals by a current straight line, and a new current straight line is calculated as each pressure measurement is received. A further means saves the slopes of the current straight lines in a slope history, the slope history being longer in time than the short time window. A mean and a standard deviation of all of the slopes in the slope history are derived, and a means detects when the slope of a new current straight line deviates from the mean of the slopes in the slope history by more than a specified multiple of the standard deviation of the slopes in the slope history, and outputs the time of this deviation as a first signal indicative of an arrival time of the wave front at the given point. A means further selects signals from the pressure history that fall within a reference time window which precedes the deviation, and approximates the pressure against time relationship of the digital signals in the reference time window by a reference straight line. Yet another means finds the end of the transient event by repeating operation of all the above-discussed means until the slope of a new current line returns to a designated slope. A pressure difference between the reference line and the current line the slope of which returned to the designated slope is derived, and this pressure difference is outputted as a second signal indicative of an amplitude of the wave front. A means is provided for rejecting the first signal as being caused by an event if the second signal is indicative of an amplitude below a specific threshold selected as indicative of noise.

Still an additional aspect of the present invention is directed to an apparatus for determining an arrival time and amplitude of a pressure wave front travelling through fluid in a pipeline due to an event which causes fluctuation of pressure in such fluid by means for measuring a characteristic related to the pressure of the fluid in the pipeline, means for converting measurements of the characteristic to electric signals, means for obtaining from the signals an indication of wave front arrival, and means for, responsive to such indication, determining the arrival time and amplitude of the wave front by means of statistical processing.

A further aspect of the present invention is directed to an apparatus for determining at a given position on a pipeline a time of arrival of a pressure wave front travelling through fluid in the pipeline due to an event which causes fluctuation of pressure in such fluid with a transducer at the given position for measuring a characteristic related to the pressure of said fluid, and means for deriving from the measured characteristic pressure values corresponding to respective discrete times occurring during an interval of time. A means selects within the time interval a first duration of a time window encompassing a plurality of the pressure values, and relates the derived pressure values to respective time windows, the first duration being such that a multiplicity of time windows are included within the time interval. A best-fit determination circuit approximates, for each of the pressure values, upon its being derived as a current value, a rate of change of fluid pressure with time by a slope of a current straight line derived from the plurality of pressure values in the time window related thereto. A means is provided for converting the measured characteristic to a signal indicative of the time of arrival of the pressure wave front by comparing the slope of the current straight line to a threshold derived from a plurality of slopes obtained for previous time windows within the time interval, and outputting the signal indicative of the time of arrival of the pressure wave front based upon the slope of a first current straight line exceeding the threshold.

A still further aspect of the present invention is directed to an apparatus for determining at a given position on a pipeline a time of arrival of a pressure wave front travelling through fluid in the pipeline due to an event which causes fluctuation of pressure in such fluid with a transducer at the given position for measuring a characteristic related to the pressure of said fluid, and a means derives from the measured characteristic a set of pressure values corresponding to respective discrete times. Another means selects a subset of a plurality of the pressure values, and relates the derived pressure values to respective subsets, these subsets being such that a multiplicity of such subsets are included within the set. A best-fit determination circuit approximates, for each of said pressure values upon its being derived as a current value, a rate of change of fluid pressure with time by a slope of a current straight line derived from the plurality of pressure values in a subset specifically related to the current value. Another means is provided for converting the measured fluid pressure characteristic to a signal indicative of the time of arrival of the pressure wave front by comparing the slope of the current straight line to a threshold derived from a plurality of slopes obtained for previous subsets, and outputs the signal indicative of the time of arrival of the pressure wave front based upon the slope of a current straight line exceeding the threshold.

Another aspect of the invention is directed to an apparatus for detecting a wave front indicative of a transient event occurring in a pipeline with a transducer positioned at a given point on the pipeline for measuring a characteristic related to pressure of a fluid in the pipeline, and for outputting analog signals proportional to the pressure. An analog to digital converter receives the analog signals, and a memory saves the digital signals in a pressure history. A means is provided for selecting the digital signals received during a short time window within the pressure history and approximating the pressure against time relationship of the received digital signals by a current straight line, a new current straight line being calculated as each pressure measurement is received. A memory saves the slopes of the current straight lines in a slope history, the slope history being longer in time than the short time window. Another means is provided for deriving a mean and a standard deviation of all of the slopes in the slope history, and a means is provided for detecting when the slope of a new current straight line deviates from such mean of the slopes in the slope history by more than a specified multiple of the standard deviation of the slopes in the slope history, and outputting the time of this deviation as a first signal indicative of an arrival time of the wave front at the given point. Another means further selects signals from the pressure history that fall within a reference time window which precedes the deviation, and approximates the pressure against time relationship of the digital signals in the reference time window by a reference straight line. The end of the transient event is found by repeating operation of the above-discussed elements until the slope of a new current line returns to a designated slope. Still another means derives a pressure difference between the reference line and the current line the slope of which returned to the designated slope, and outputs this pressure difference as a second signal indicative of an amplitude of the wave front. A means is provided for rejecting the first signal as being caused by an event if the second signal is indicative of an amplitude below a specific threshold selected as indicative of noise.

Another aspect of the present invention is directed to an apparatus for determining an arrival time and amplitude of a pressure wave front travelling through fluid in a pipeline due to an event which causes fluctuation of pressure in such fluid with means for measuring a characteristic related to the pressure of the fluid in the pipeline, means for converting measurements of the characteristic to electric signals, means for obtaining from the signals an indication of wave front arrival, and means for, responsive to such indication, determining the arrival time and amplitude of the wave front by means of statistical processing.

Still another aspect of the present invention is directed to an apparatus for determining at a given position on a pipeline a time of arrival of a pressure wave front travelling through fluid in the pipeline due to an event which causes fluctuation of pressure in such fluid with a transducer at the given position on the pipeline responsive to a characteristic related to the pressure of the fluid for producing an analog output. An analog to digital ("A/D") converter is coupled to the transducer for outputting signals corresponding to discrete pressure values. A first best-fit determination circuit is coupled to the A/D converter for, upon a current pressure value being outputted by the A/D converter, forming a current best-fit straight line from a related respective set of the pressure values. A comparator is coupled to the first best-fit determination circuit and to a threshold signal for producing an output signal when the threshold is exceeded by a slope of a current best-fit line. A detection circuit is coupled to a time reference and the comparator for outputting an arrival time signal in response to the output signal of said comparator.

A still further aspect of the present invention is directed to a method for determining at a given position on a pipeline a time of arrival of a pressure wave front travelling through fluid in the pipeline due to an event which causes fluctuation of pressure in such fluid by measuring at the given position a characteristic related to the pressure of the fluid, and deriving therefrom pressure values corresponding to respective discrete times occurring during an interval of time. For each discrete time, a rate of change of fluid pressure with time is approximated by a slope of a straight line derived from a plurality of pressure values occurring earlier. A time when the rate of change exceeds a threshold is identified, and a reference straight line is obtained from pressure values in a designated period prior to the identified time. A maximum-slope straight line is derived from pressure values occurring in a period occurring after the identified time, and an intersection between the reference straight line and the maximum-slope straight line is determined. A signal is outputted which is indicative of the time of arrival of the wave front corresponding to the point of intersection.

Yet another aspect of the present invention is directed to an apparatus for determining at a given position on a pipeline a time of arrival of a pressure wave front travelling through fluid in the pipeline due to an event which causes fluctuation of pressure in such fluid with means for measuring at the given position a characteristic related to the pressure of said fluid, and deriving therefrom pressure values corresponding to respective discrete times occurring during an interval of time, means for approximating for each discrete time a rate of change of fluid pressure with time by a slope of a straight line derived from a plurality of pressure values occurring earlier, means for identifying a time when the rate of change exceeds a threshold, means for obtaining a reference straight line from pressure values in a designated period prior to the identified time, means for deriving a maximum-slope straight line from pressure values occurring in a period occurring after the identified time, means for determining an intersection between the reference straight line and the maximum-slope straight line, and means for outputting a signal indicative of the time of arrival of the wave front corresponding to the point of intersection.

An additional aspect of the present invention is directed to an apparatus for determining at a given position on a pipeline a time of arrival of a pressure wave front travelling through fluid in the pipeline due to an event which causes fluctuation of pressure in such fluid with a transducer for measuring at the given position a characteristic related to the pressure of the fluid, and means for deriving therefrom pressure values corresponding to respective discrete times occurring during an interval of time. A best-fit determination circuit approximates for each discrete time a rate of change of fluid pressure with time by a slope of a straight line derived from a plurality of pressure values occurring earlier. A means is provided for identifying a time when the rate of change exceeds a threshold. A best-fit determination circuit obtains a reference straight line from pressure values in a designated period prior to the identified time. A best-fit determination circuit also derives a maximum-slope straight line from pressure values occurring in a period occurring after the identified time. A means is provided for determining an intersection between the reference straight line and the maximum-slope straight line, and a signal is outputted which is indicative of the time of arrival of the wave front corresponding to the point of intersection.

The above object as well as other objects and advantages of the present invention will become apparent from the following detailed description, taken in conjunction with the appended drawings.

DETAILED DESCRIPTION OF THE INVENTION

Figure 1:
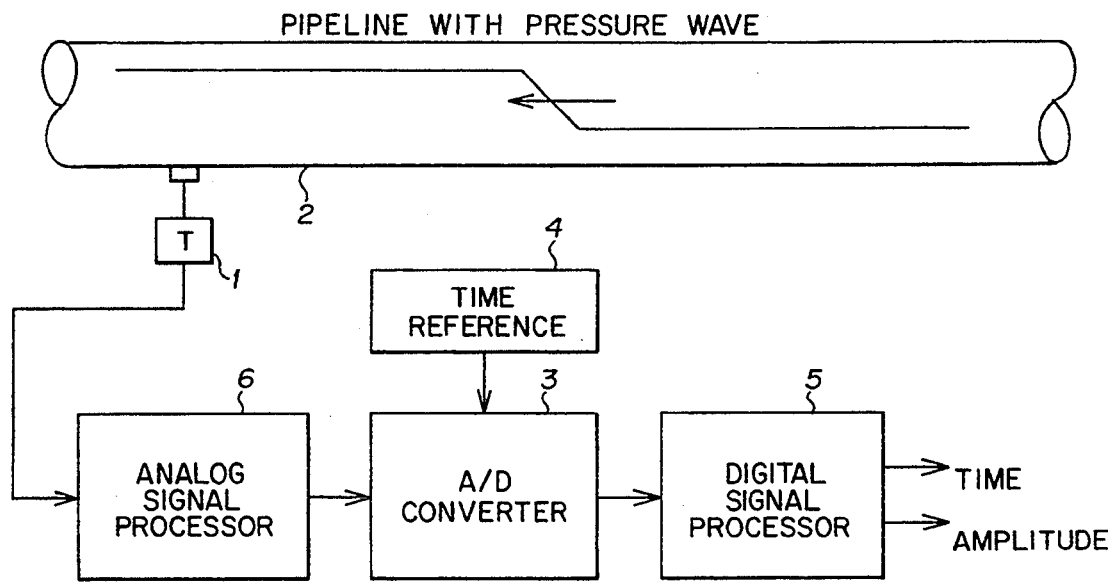
FIG. 1 is a block diagram of one embodiment of the invention.

Referring to FIG. 1, a transducer 1 is installed on the pipeline 2 so as to convert the internal fluid pressure to an analog electrical signal. This is usually a pressure transducer, but could be a strain gauge measuring pipe wall deflection, a microphone, or any other sensor capable of responding to pressure transients. In the preferred embodiment, it is a high quality industrial pressure transducer with a range high enough to handle the maximum pipeline pressure plus noise, and having a resolution high enough to resolve the smallest wave amplitude of concern at the longest distance desired, as affected by damping in the pipeline. Its frequency response must also be wide enough to accurately measure the shape of the transient wave. For example, on a commercial gasoline pipeline, a zero to 2000 psi transducer with at least 0.03 psi resolution and a frequency response of at least 50 Hz would be suitable for detecting 0.1 psi transients.

The transducer output signal contains considerable noise due to turbulence in the fluid and some instrument noise. Some of this noise may well contain frequencies higher than half the sample rate of the A/D converter (the Nyquist frequency) used in the system (see below). There may also be large signal offset due to the static component of the pipeline pressure.

Figure 3:
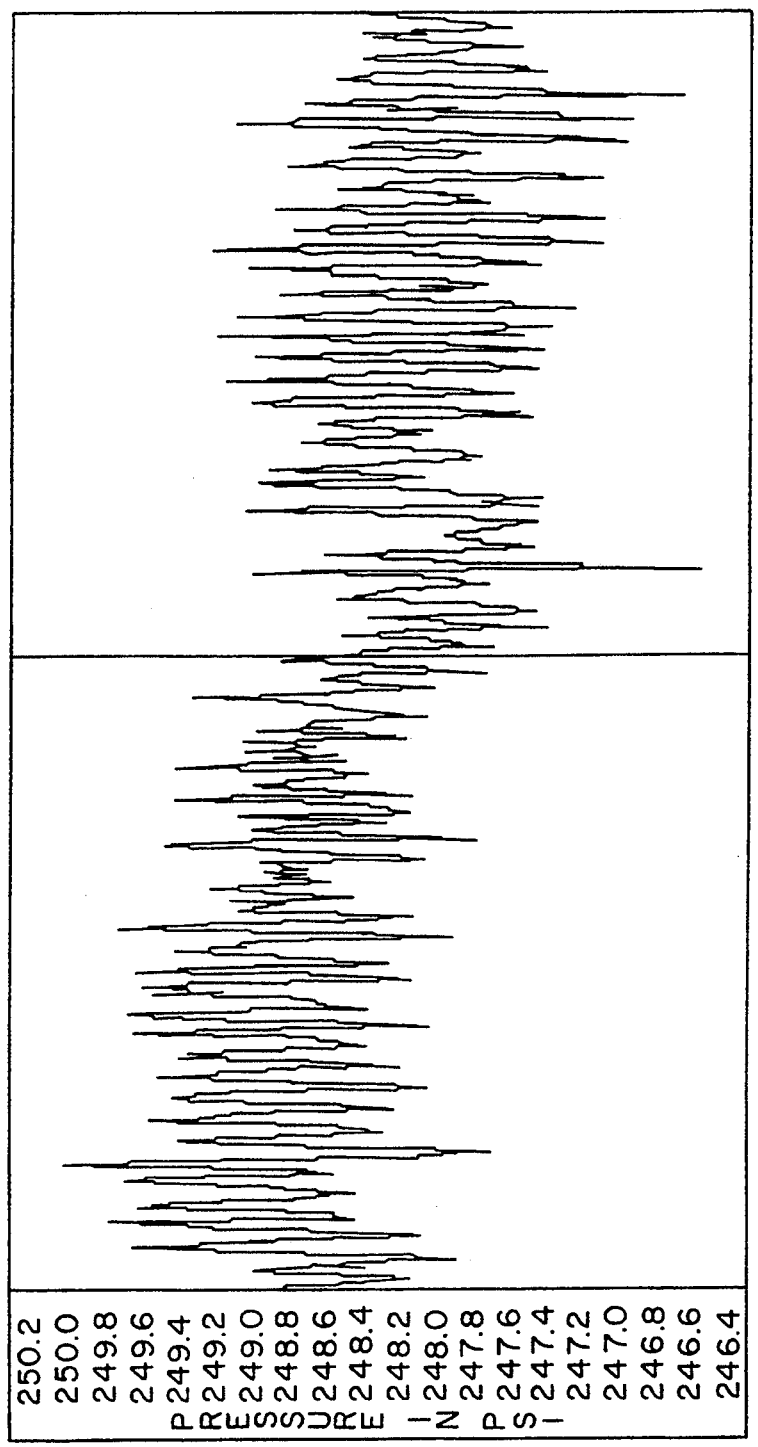
FIG. 3 is a signal-to-noise illustration in a typical pipeline.

These signal components interfere with the operation of the wave detecting algorithm in the digital signal processor, and should be reduced as much as possible by filtering. The filter parameters depend on the noise characteristics, but a passband of approximately 0.1 Hz to 50 Hz would be typical. This filter is different in performance from that described above as part of the prior art discussion. That filter of the prior art has a relatively low cutoff frequency and, therefore, discards information on the wave front which is needed to accurately determine its amplitude and time of arrival. This invention utilizes a filter with a wider bandpass which preserves such highly useful wave front information. Of course, additional noise gets through such a filter. However, the overall approach of this invention, including the statistical processing technique described below, can handle such noise. In fact, this can be done even when (as shown in FIG. 3) the peak-to-peak noise in a pipeline approaches or exceeds the amplitude of the leading edge of the leak-indicative signal; in other words, when the signal-to-noise ratio is below 1:1.

The electrical signal from the transducer is fed to filter 6. Since this filter can be of conventional design, no details thereof are deemed necessary.

The A/D converter 3 receives the filter output signal and converts it to digital measurements at a sample rate sufficient to resolve the shape of the leading edge of the wave front. Two or three sample points during the rising or falling edge are usually sufficient. This rate might vary between 10 Hz and 100 Hz depending on the pipeline. In the preferred embodiment, a rate of 25 samples per second is used.

The system time reference 4 allows the exact time each sample is taken to be known. This is required for accurate determination of the arrival time of the wave front. In the preferred embodiment, the time reference is a clock synchronized to radio station WWV. Other standards such as atomic clocks, Global Positioning System satellite receivers, or time signals received from a network master station may also be suitable.

The digital signal processor 5, referred to as the DSP, accepts the data samples from the A/D converter, executes a wave front detection algorithm (see below), and generates the arrival time and amplitude outputs. In the preferred embodiment, the DSP is a micro-processor.

Figure 4:
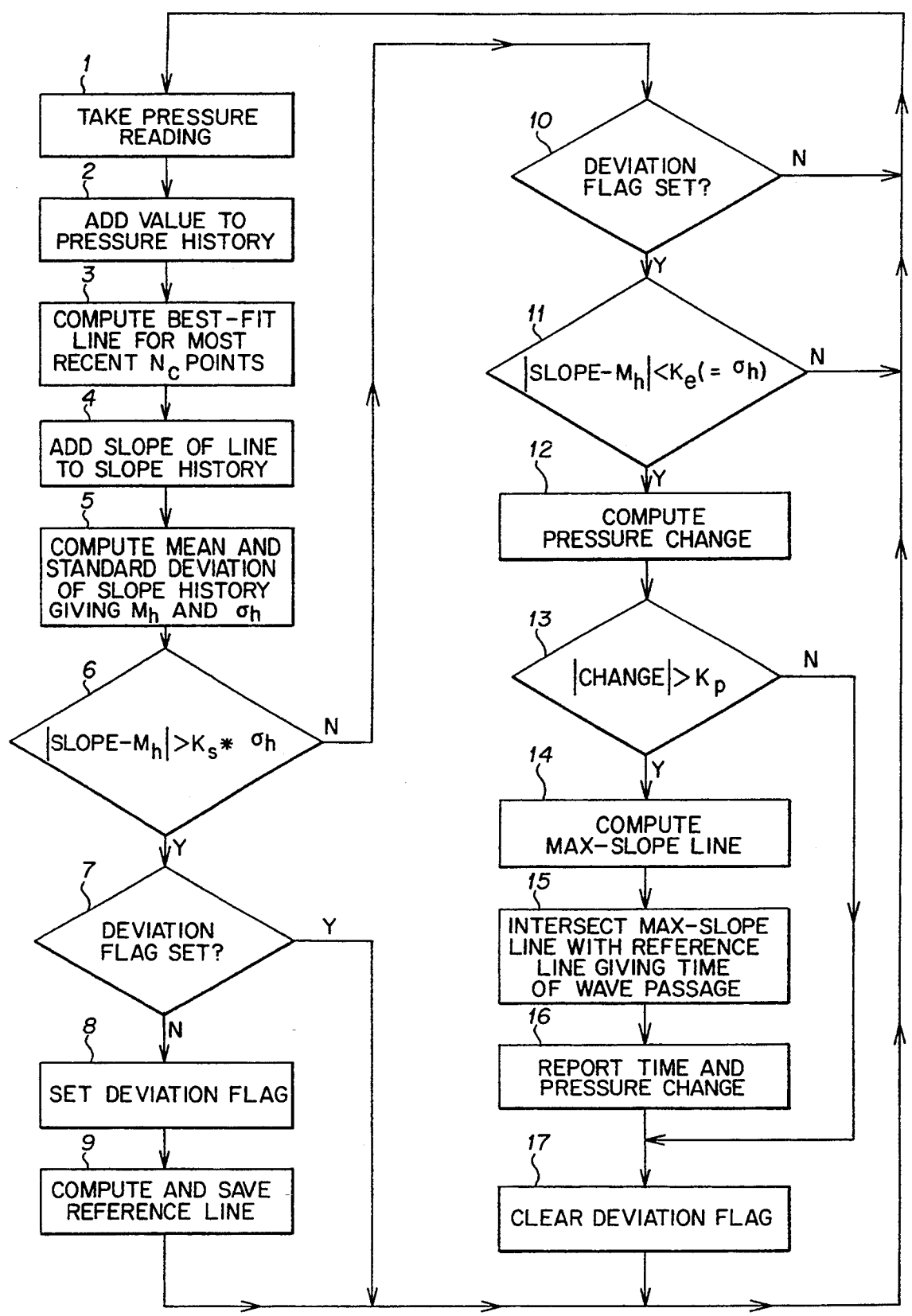
FIG. 4 is a flow chart of the wave detection algorithm.

Referring to FIG. 4, the wave detection algorithm operates on the premise that a wave front in the pipeline will result in a statistically significant change in the pressure of the fluid. It uses known statistical methods which determine whether a given set of acquired data is a member of the population of all other acquired data. The inference is that if the most recent data is statistically different, then this data must be from a different population and, therefore, represents a change in the pipeline operating conditions.

The following discussion relating to FIG. 4 will describe the detection of a negative pressure wave, but detection of a positive wave is completely analogous.

When each pressure reading is taken per step 1, it is stored per step 2 in a pressure history which always contains the most recent $N_p$ readings. In the preferred embodiment, the value of $N_p$ is 500 representing a time interval, or window, of 20 seconds at 25 samples per second.

When each reading has been stored, a least squares procedure, such as linear regression, is used per step 3 to compute the straight line which best fits the last $N_c$ pressure samples, where $N_c$ is smaller than $N_p$. In the preferred embodiment, $N_c$ is 125 representing a time window of 5 seconds.

The slope of this line is then stored per step 4 in a slope history which contains the most recent $N_h$ such slopes. In the preferred embodiment, $N_h$ is equal to $N_p$. The arithmetic mean, $M_h$, and standard deviation, $\sigma_h$, of all $N_h$ slopes in the slope history are calculated per step 5.

If it is determined in step 6 that the most recent slope differs from $M_h$ by more than $K_s$ times $\sigma_h$, it is assumed to represent a different population and, therefore, may indicate a wave front. $K_s$ must be adjusted for best performance in a particular noise environment. In the preferred embodiment, $K_s$ is approximately 5 to 10.

Once the slope has been found to exceed this threshold, a binary deviation flag is checked per step 7 to see if this transient has already been detected. If not, the deviation flag is set per step 8. At a later point in this procedure it will be necessary to know the profile of the pressure which existed prior to the pressure drop. Therefore, when the threshold is exceeded a best-fit reference line is constructed per step 9 through $N_r$ data points. $N_r$ can equal $N_c$, although the selected value of $N_r$ can vary depending on specific pipeline conditions. However, the time window for such $N_r$ data points should not include data points which are part of the pressure drop. Therefore, if the threshold is exceeded at a current data point $N_i$, the time window cannot extend from $N_{i-r}$ to $N_i$ so that the pressure profile which is computed as having existed prior to the pressure drop is not distorted by inclusion of data on the pressure drop. Consequently, in accordance with the invention, the time window is to conclude at $N_{i-Ro}$ where Ro is a time lag. Preferably, Ro is 10, although this can also vary depending on specific pipeline conditions. In other words, the $N_r$ points extend from data point $N_{i-Ro-Nr}$ to data point $N_{i-Ro}$. The slope and offset of this reference line are stored as part of step 9 for later use.

Data points continue to be collected and best-fit lines constructed by executing steps 1 to 7 repeatedly after the $K_s$ times $\sigma_n$ threshold is exceeded per step 6. When the slope of the line representing the most recent $N_c$ data points returns to fall below such threshold, step 6 leads to step 10. The deviation flag is checked per step 10 to see if an event is still being observed, as determined by step 11. More specifically, step 11 checks whether the slope of the current line decreases to within a tolerance $K_e$ of the slope of the reference line $S_r$. When it does, it is determined that the transient event has ended. $K_e$ is adjusted by the operator to optimize the detection of the end of the pressure drop. In the preferred embodiment, $K_e$ is equal to $\sigma_h$.

It is necessary to verify that the disturbance which was noted has resulted in a significant change in the pipeline operating conditions. More specifically, the amplitude of the wave front is compared against a threshold value. In order to do so, the reference line is projected sufficiently forward in time so that the difference between it and the line through the most recent $N_c$ points is computed per step 12 at the time corresponding to the oldest of the $N_c$ points (see FIG. 7 at point $N_c$ and the details provided below with respect to operation of the circuitry shown in FIG. 5). It is noted that step 12 is performed only once after the deviation flag is set per step 7, namely only immediately after step 11 yields a "YES" result. In such a case, the deviation flag is cleared per step 17, and step 12 will not be reached again, due to step 10, unless the flag is set once more per step 7. Details regarding one way with which the circuit equivalent of step 12 is performed are provided below with respect to FIGS. 5 and 7.

The pressure amplitude difference value determined by step 12 is taken to be the amplitude of the suspected wave. If the drop exceeds a given threshold $K_p$, as determined by step 13, the pressure drop is regarded not as noise but as an event. Smaller drops are assumed to be due to noise and are ignored. $K_p$ is adjusted to define the sensitivity of the system to pressure changes. In a typical application, $K_p$ is set to about 0.1 psi.

When a pressure amplitude change exceeding the preset threshold has been detected by step 13, the next step is to locate the precise beginning of the change, namely the arrival time of the wave front. A best-fit line is found per step 14 that has the largest slope of all such lines which are computed using $N_M$ points corresponding to the pressure as it was actually falling. Thus, the $N_M$ points are taken from the pressure history corresponding to data points between the one at which the test of step 6 was first met and the oldest data point used to determine the line at which the test of step 11 is met. $N_M$ is a number considerably less than $N_c$ (in the preferred embodiment it is equal to 5.) The time corresponding to the intersection of this maximum slope line and the reference line is taken per step 15 to be the arrival time, and is reported per step 16. More details on this range of data points and one way with which the circuit equivalent of step 15 operates are provided below with respect to FIGS. 5 and 7.

Whether or not the amplitude exceeds $K_p$, as determined by step 13, the deviation flag is cleared per step 17 in order to reset the system so that arrival of the next wave front can be detected.

The values of the above constants $N_p$, $N_c$, $N_h$, $N_r$, $N_M$, $K_s$, $K_e$, and $K_p$ are adjusted to optimize performance in a particular pipeline noise environment. The adjustments are made by a skilled operator empirically and based on his general expertise in pipelines and with use of the present invention, and on calibration utilizing observations of the performance of the system in the particular pipeline in which a system embodying the principles of the present invention has been installed. These values may be fixed, or they may be continuously changed to conform to current conditions. For example, it is contemplated that as experience with this invention grows and based on statistics accumulated as a result of its use are collected and analyzed, the system will be able to tune itself optimally in an automatic manner by adjusting the constants to a high level of sensitivity until a false alarm is generated, and then backing off on the values.

Figure 2:
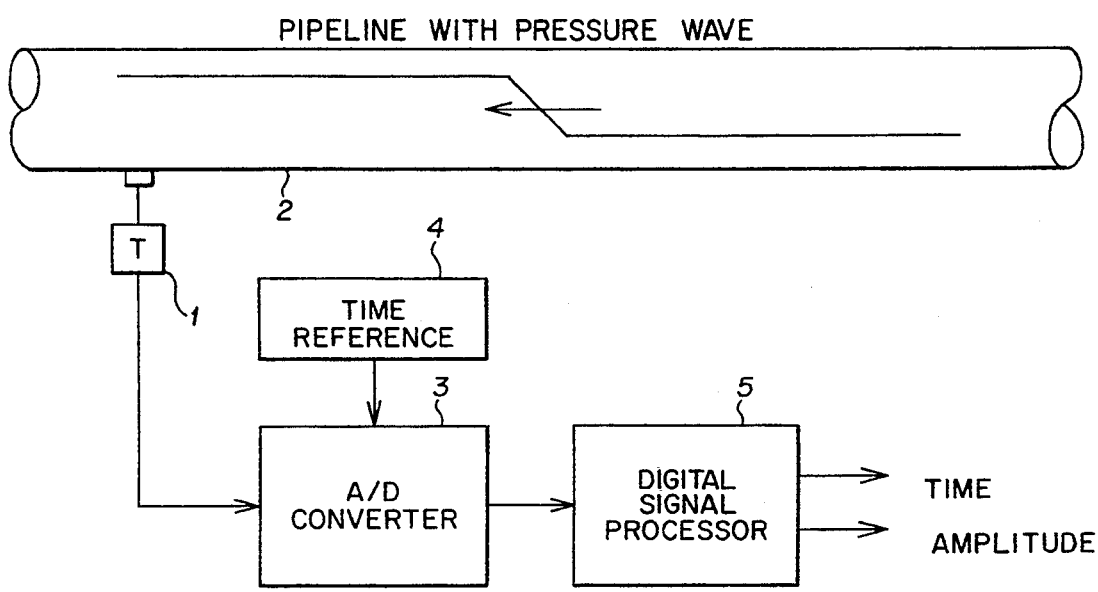
FIG. 2 is a block diagram of another embodiment of the invention.

Referring to FIG. 2, it shows an all-digital embodiment of this invention, without the use of an analog filter. The operation is the same as described above for FIG. 1, except that the output signal from the transducer 1 is applied directly to the A/D converter 3. This requires that the A/D sample rate be at least twice the highest significant frequency component (including noise) in the transducer output signal, typically from 100 Hz to 1000 Hz. In this embodiment, the noise filters must be implemented digitally within the DSP. Many suitable filter algorithms are well known to competent designers and, therefore, a detailed explanation thereof is not deemed to be necessary. In this regard, reference is made to the book by Oppenheim, Alan V. and Schafer, Ronald W., *Discrete—Time Signal Processing*, Prentice Hall, Englewood Cliffs, N.J., 1989.

Figure 5:
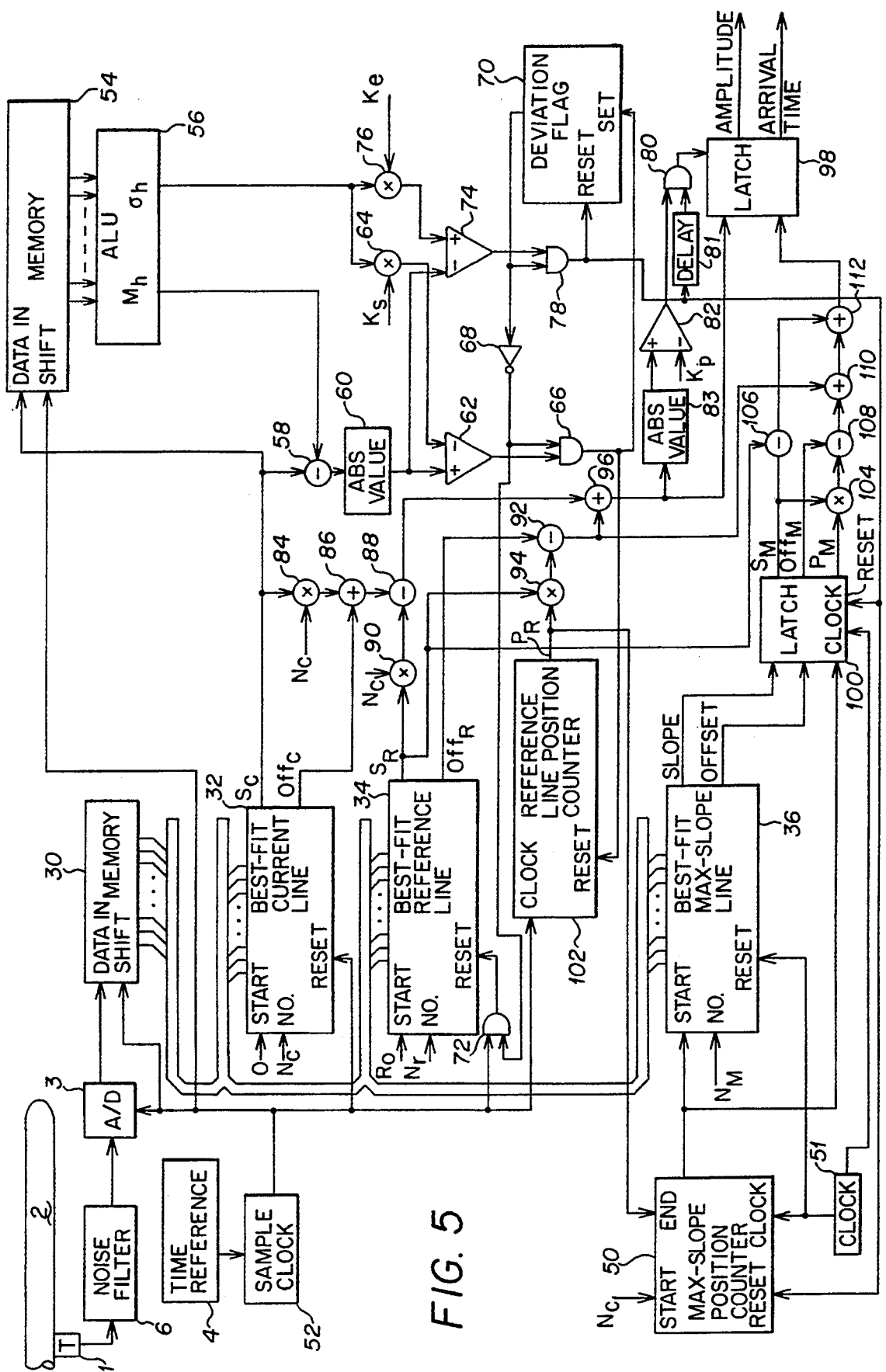
FIG. 5 is a schematic circuit diagram showing more details of the block diagram of FIG. 1.

FIG. 5 depicts circuitry for implementing the present invention. Transducer 1, A/D converter 3, time reference 4, and filter 6 operating with measurements taken of fluid in pipeline 2 are the same as the like-numbered components in FIG. 1. The rest of the elements shown in FIG. 5 correspond to digital signal processor 5 of FIG. 1.

Memory 30 stores the $N_p$ readings which constitute the pressure history. As explained above, this corresponds to the last 500 pressure measurement data points generated by A/D converter 3. Memory 30 is a shift register receiving the output of A/D converter 3 at its DATA IN input, and the data therein is shifted by a clock signal from sample clock circuit 52 received at its clock input. Upon occurrence of each clock signal, the oldest data point is shifted out of memory 30 as the current data point is stored. The sample clock is generated from and is synchronized with time reference 4.

Memory 30 has an output corresponding to each of its stored data points, i.e. 500, so that all can be outputted in parallel. The output lines of memory 30 are connected to best-fit current line circuit 32, best-fit reference line circuit 34, and best-fit maximum-slope line circuit 36. The circuitry for all three of circuits 32, 34 and 36 is the same, and only the inputs thereto differ. The circuitry therefor is shown in FIG. 6.

Figure 6:
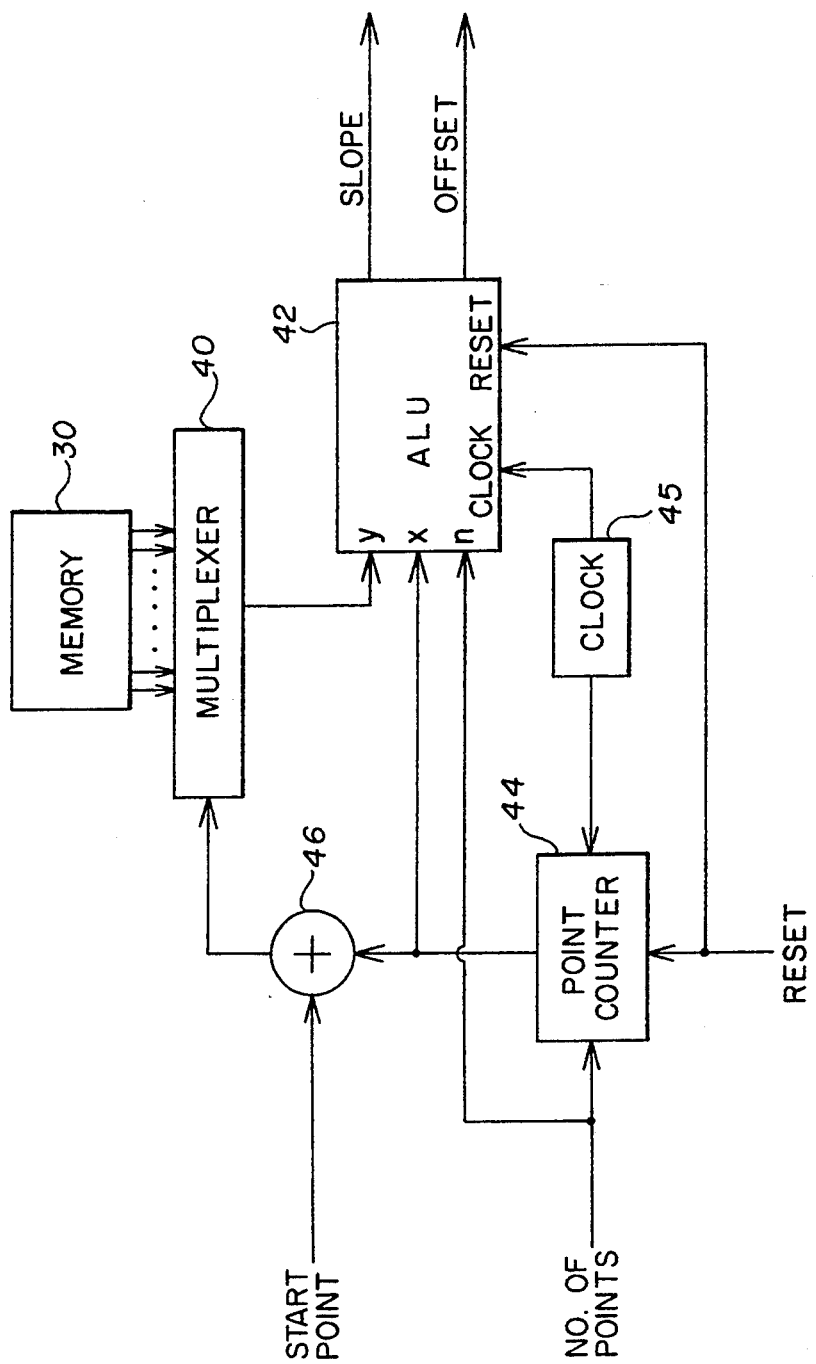
FIG. 6 is a schematic circuit diagram showing details of the circuitry for determining a best-fit line.

As depicted in FIG. 6, a circuit to compute a best-fit line receives the outputs from pressure history memory 30 at multiplexer 40 which has an addressing input. The output of multiplexer 40 will be that of whichever one of its inputs from memory 30 which is designated at its addressing input. The output of multiplexer 40 is a signal corresponding to the pressure measurements made by transducer 1. This pressure data is provided to input "y" of arithmetic logic unit ("ALU") 42.

The "x" input of ALU 42 receives a sequence of integers which can be in the range from 0 up to a preset maximum, as discussed below. This signal is obtained from point counter 44 which is synchronized by a clock 45 with ALU 42 to operate at certain time intervals. Thus, the "x" input corresponds to time. In other words, if the clock frequency is 1 ms, then $x=5$ corresponds to 5 ms. The selection of x and y to identify the inputs of ALU 42 is intended to relate such signals to an x-y graph, in which x and y are the axes thereof so as to directly correspond to the way pressure is graphed, with x being time and y being the measured pressure, as shown in FIG. 3. Clock 45 includes a local oscillator which has a frequency higher than that of the sample clock 52 so that all the calculations required by circuits 32, 34 and 36 to compute the slope and offset values of a straight line are completed within a sample clock time period.

A data point Ni stored in memory 30 is processed for the purpose of determining a straight line therefor by providing a start-point signal (derived as explained below) which is inputted to adder 46. The total number of points to be sequenced thru is set by a number-of-points signal (derived as explained below) inputted to point counter 44. Thus, after point counter 44 is reset to 0, the address provided to the addressing input of multiplexer 40 is the sum of the start point and the output of point counter 44 which is also inputted to adder 46. Point counter 44 continues to be sequenced upward by clock 45 until it reaches a number equal to that set by the number-of-points signal at its input. It then stops further sequencing of digits to inhibit outputting additional data points via multiplexer 40.

The number-of-points signal is also provided to input "n" of ALU 42 which uses the signals at its x, y and n inputs to calculate the slope and offset of a best-fit line with the following equations:

$$\text{slope} = \frac{n\Sigma xy - \Sigma x \Sigma y}{n\Sigma x^2 - (\Sigma x)^2} \quad (1)$$

$$\text{offset} = \frac{\Sigma x^2 \Sigma y - \Sigma x \Sigma xy}{n\Sigma x^2 - (\Sigma x)^2} \quad (2)$$

The slope and offset values are then outputted by ALU 42. At the appropriate time, as explained below, point counter 44 and ALU 42 are reset. ALU 42 operates in accordance with clock 45.

Figure 7:
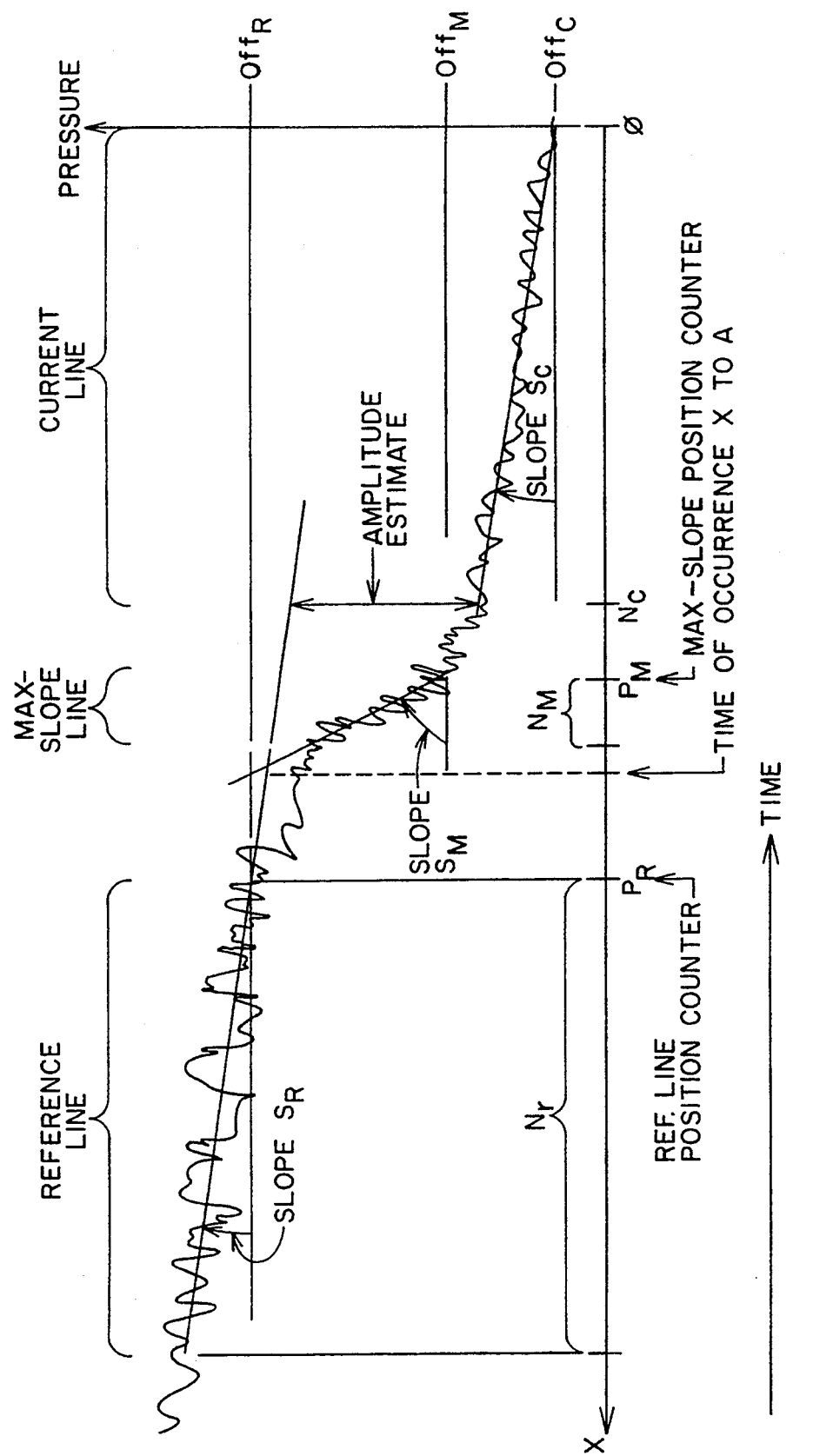
FIG. 7 is a graph showing straight lines which are useful for determining the time of arrival and the amplitude of a wave front.

It is noted that the values of x for a given data point $N_i$ correspond to an x axis which extends into the past, as shown in FIG. 7. The most recent point, which corresponds to the data point being processed, is at $x=0$, and older points correspond to positive values of x. Each time a new pressure measurement sample data point is entered into pressure history memory 30, it is stored in the $x=0$ address location. All older points simultaneously increase their x coordinate by 1, with the oldest point shifting out of the memory and being lost.

Three best-fit lines are computed, namely for the current line, for the reference line, and for the maximum slope line. Because these three best-fit lines are computed at different times, each is computed and expressed in relation to its own x-coordinate system (with $x=0$ at the starting point of the line). The three best-fit lines are defined by the following mathematical equations.

Current line: $y = S_c x_c + Off_c$ (3)

Reference line: $y = S_R x_R + Off_R$ (4)

Maximum-slope line: $y = S_M x_M + Off_M$ (5)

where S and Off denote the slope and offset, respectively.

When the wave front has passed (i.e., at the end-of-event time), as determined by step (11), for example, the three coordinate systems must be related to each other so that the arrival time and amplitude of the wave front can be ascertained. This is accomplished as follows, where x (no subscript) denotes the coordinate corresponding to the content of memory 30 at a given time:

$x_c = x$ (since the current line always starts at 0) (6)

$x_R = x - P_R$ (7)

$x_M = x - P_M$ (8)

where $P_R$ and $P_M$ represent the starting points of the reference line and maximum slope line, respectively, as shown in FIG. 7.

Substituting the above x transformations into the equations (3), (4) and (5) yields at the end-of-event time:

Current: $y = S_c x + Off_c$ (10)

Reference: $y = S_R(x - P_R) + Off_R$ (11)

Maximum slope: $y = S_M(x - P_M) + Off_M$ (12)

To compute the amplitude of the wave front, as per step 12 for example, the difference is calculated between the reference line and the current line computed at the oldest point (i.e. having the highest x value) in the current line $(x - Nc)$, as follows:

$$\text{Amplitude} = [S_R(N_c - P_R) + Off_R] - [S_c N_c + Off_c] \quad (13)$$

$$= S_R N_c - S_R P_R + Off_R - S_c N_c - Off_c \quad (14)$$

The arrival time is considered to be the x - coordinate of the intersection of the reference line and the maximum slope line. This is determined as follows from equations (11) and (12):

$$S_R(x_{TOA} - P_R) + Off_R = S_M(x_{TOA} - P_M) + Off_M \quad (15)$$

where $x_{TOA}$ is the time of arrival.

Solving for $x_{TOA}$ yields $$x_{TOA} = \frac{S_M P_M - S_R P_R + Off_R - Off_M}{S_M - S_R} \quad (16)$$

Returning now to FIG. 5, the circuitry can be more readily understood keeping the explanation presented just above in mind. More specifically, the best-fit current line circuit 32 operates as described above with respect to FIG. 6, and it receives a start point signal of 0 and a number of points signal of $N_c$ (e.g. 125). The outputs of circuit 32 are $S_c$ and $Off_c$.

Best-fit reference line circuit 34 operates as described above with respect to FIG.6 and it receives a start point signal based on $R_o$ (e.g. 10). In other words, as explained above, the start point will be 10 data points (i.e. $R_o$) before the data point at which step 6 detects the threshold to have been exceeded. The number of points signal is $N_r$. The outputs of circuit 34 are $S_R$ and $Off_R$.

Best-fit maximum slope line circuit 36 also operates as described above with respect to FIG. 6, and it receives a start point signal from maximum-slope position counter 50, as described below. Circuit 36 also receives a number of points signal $N_M$ (e.g. 5). The outputs of circuit 36 are slope and offset values.

Upon each occurrence of the sample clock, A/D converter 3 produces a data point. Consequently, the operation of digital signal processor 5 is tied to the sample clock. Specifically, it controls pressure history memory 30, circuits 32 and 34, slope history memory 54, and others, as described below.

Slope history memory 54 receives the slope output from circuit 32, and stores the last $N_h$ slopes (e.g. 500). ALU 56 calculates the arithmetic mean $M_h$ and the standard deviation $\sigma_h$ from the 500 slopes stored in memory 54 in accordance with a conventional method. Therefore, no further details are deemed necessary.

The circuitry of FIG. 5 performs an equivalent of step 6 as follows. Subtractor 58 subtracts the arithmetic mean slope $M_h$ provided to it by ALU 56 from current line slope $S_c$ outputted by circuit 32. The absolute value is computed by circuit 60 which inputs it to comparator 62 whose other input is obtained from multiplier 64.

The $K_s$ parameter is multiplied in multiplier 64 by $\sigma_h$ derived from ALU 56. Consequently, comparator 62 makes the comparison of step 6. When the output of comparator 62 goes to a high logic level due to the absolute value of $(S_c - M_h)$ exceeding $k_s\sigma_h$, AND gate 66 goes high. This is because, due to the output of deviation flag circuit 70 being low previously, the output of invertor 68 was high when comparator 62 went high. The high output of AND gate 66 sets the deviation flag in circuit 70 and, thus, corresponds to a YES output of step 6.

The high output of deviation flag circuit 70 resulting from the flag being set is coupled to AND gate 72 via invertor 68, thereby preventing AND gate 72 from going high when the sample clock at its other input occurs. Since AND gate 72 is connected to the reset input of circuit 34, as long as the deviation flag is set in circuit 70, AND gate 72 prevents best-fit reference line circuit 34 from being reset. Therefore, the $S_R$ and $Off_R$ values for the reference line which were calculated when the deviation flag was set are retained, and reference line position counter 102 is reset.

The equivalent of step 11 is effected by the circuitry of FIG. 5 as follows. The absolute value of (slope $-M_h$) at the output of circuit 60 is compared in comparator 74 with the $K_e\sigma_h$ product inputted to it from multiplier 76. Comparator 74 goes high when $K_e\sigma_h$ exceeds the absolute value of (slope $-M_h$). This output causes AND gate 78 to go high because both of its inputs, namely from deviation flag circuit 70 and comparator 74, are high at that point in time. A high output of AND gate 78 is equivalent to a "YES" at the termination of step 11. The high output of AND gate 78 resets the flag in circuit 70.

One input of AND gate 80 receives the output of AND gate 78 via a delay circuit 81. The output of comparator 82 is connected to the other input of AND gate 80. The positive threshold of comparator 82 is the absolute value of the amplitude as per equation 14 above and is derived from circuit 83. More specifically, multiplier 84 produces the product $S_cN_c$ which is summed with $Off_c$ in adder 86. Subtractor 88 computes the difference between $S_RN_c$ from multiplier 90 and the output of adder 86 to generate $S_RN_c - (S_cN_c + Off_c)$. Subtractor 92 subtracts $S_RP_R$ outputted by multiplier 94 from $Off_R$. Adder 96 then generates $S_RN_c - S_cN_c - Off_c + Off_R - S_RP_R$.

The value of this wave front amplitude at the output of adder 96 is inputted to output data latch 98. When both AND gate 78 and comparator 82 are high, this causes AND gate 80 to go high and to latch the value on the inputs to circuit 98.

Best-fit maximum slope line circuit 36 operates to calculate a straight line based on $N_M$ (e.g. 5) points for an interval of points between $N_c$ and $P_R$ (See FIG. 7). Counter 50 is reset when AND gate 78 goes high.

FIG. 7 illustrates the location of the x-y origin for the data point at which AND gate 78 goes high. The search for the best-fit maximum slope line begins at $x = N_c$ which is the oldest point used to determine the current line which caused AND gate 78 to go high. Clock 51 triggers counter 50 to set $N_c$ at its output, and this serves as the first start signal for circuit 36. Circuit 36, under control of its local oscillator (recalling the discussion above regarding clock 45 of FIG. 6), calculates a best-fit line for $N_M$ points, and outputs the slope and offset values to latch 100. Clock 51 then increments counter 51 to provide a second start signal of $N_c + 1$ to circuit 36, and the same process is repeated.

The frequency of clock 45 in circuit 36 is high enough so that all its calculations are completed between pulses of clock 51. Likewise, the frequency of clock 51 is high enough to complete the calculations for all of the data points within the start-end range of counter 50 between pulses of sample clock 52.

The end point of the operating range of counter 50 is set by the output of reference line position counter 102. In particular, it will be recalled that counter 102 is reset to zero when AND gate 66 goes high (i.e. the condition of step 6 is met). In terms of FIG. 7, this occurs at $x = P_R - R_O$. Counter 102 keeps track of this number as the x-y origin moves to the right (as shown in FIG. 7, and with each succeeding data point). Thus, when the AND gate 66 goes high, the output of counter 102 is zero because the origin is at the data point at which the reference line was calculated. For the next data point, counter 102 is triggered by sample clock 102 to sequence to a value of 1, then to 2, and so on. Therefore, when AND gate 78 goes high (i.e. the condition of step 11 is met), counter 102 registers the exact number of data points which have been processed since the one for which the reference line was calculated (i.e. which first met step 6).

The resulting slope and offset values for each of the lines calculated by circuit 36 are inputted to latch 100 along with the position count on the x-coordinate of that line (see FIGS. 5 and 7). The position count for a line is the output of counter 50. The latch 100 compares the current slope at its input to the one already stored therein, and stores the slope, offset and position data corresponding to whichever of those two lines has the steeper slope. This sequence is repeated until the x-coordinate value of the end point (i.e. $P_R - R_O$) is reached. The maximum slope stored by latch 100 and outputted by it is $S_M$, and the offset value and position count corresponding thereto are, respectively, $Off_M$ and $P_M$.

Multiplier 104, subtractors 106 and 108, and adders 110 and 112 produce at the input of latch 98 a value for arrival time $X_{TOA}$ in accordance with equation (16). This value for the arrival time is latched when AND gate 80 sets latch 98, as described above.

Delay circuit 81 is provided at the output of AND gate 78 to insure that the signals generated at the inputs of latch 100 settle properly after counter 50 and circuit 36 are reset, and only then (i.e. after such delay) is latch 98 actuated. Other delay circuits may be required in processor 5 for such a purpose depending on the specific implementation of the particular circuits. The need for and implementation of such delays are readily apparent to one ordinarily skilled in the art. Therefore, details thereof are not deemed necessary. Also worthy of mention is the possibility that, depending on the value of $N_c$ and the data point at which AND gate 78 goes high, $N_c$ may have a value higher than the end point outputted by counter 102 (see FIG. 7). In that case, counter 50 could not function. This condition would be noticed by the operator in the course of calibrating processor 5 in connection with, for example, testing the system during its installation on a particular pipeline. The operator sets $N_c$ to a value which avoids this condition.

In a simple installation, the detection of the wave front arrival time could be used directly to sound an alarm, with the amplitude helping to find the location and/or size of the leak, for example. A more sophisticated application would involve transmitting the time, amplitude, and perhaps other information from each of several of these sites on the pipeline to a central station, where an operator or master computer could use the information to determine the location of a leak or other event, and reject waves caused by other transient sources.

Monitoring sites based on the herein described invention could be located at some convenient place on the pipeline, miles from a valve which is to be monitored. Each time the valve is commanded to operate, a pressure transient of the appropriate amplitude (including polarity) and arrival time could be detected by this invention, and a simple logical comparison with the valve commands could be made to confirm its correct operation.

The above are just a few of many examples of how the time and amplitude, once extracted from a noisy pipeline pressure signal, can be used in a variety of critically important applications.

Although details of the preferred embodiment have been disclosed above, various modifications thereto are readily apparent to one with ordinary skill in the art. For example, a curve shape other than a straight line could be used to approximate the pressure vs time relationship. Also, the curve fitting procedures used for the approximations could be based on some criterion other than "least-squares". These and other such modifications are all intended to fall within the scope of the present invention as defined by the following claims.

We claim:

1. A method for determining at a given position on a pipeline a time of arrival of a pressure wave front travelling through fluid in the pipeline due to an event which causes fluctuation of pressure in such fluid, comprising the steps of:

measuring at the given position a characteristic related to the pressure of said fluid, and deriving from said measured characteristic pressure values corresponding to respective discrete times occurring during a first interval of time;

selecting within said first time interval a first duration of a time window encompassing a plurality of said pressure values, and relating the derived pressure values to respective time windows, said first duration being such that a multiplicity of time windows are included within said first time interval;

for said pressure values, upon each being derived as a current value, approximating a rate of change of fluid pressure with time by a slope of a current straight line, said slope being derived from said plurality of pressure values in the time window related to said current value;

converting said measured characteristic to a signal indicative of the time of arrival of said pressure wave front by comparing the slope of the current straight line to a threshold derived from a plurality of slopes obtained for previous time windows within said first time interval, and outputting said signal indicative of the time of arrival of said pressure wave front based upon the slope of a first current straight line exceeding said threshold.

2. The method of claim 1, wherein the converting step includes the steps of determining a mean and a standard deviation of the slopes for the straight lines related to pressure values within said first time interval, and setting said threshold as said mean plus a predetermined multiple of said standard deviation.

3. The method of claim 1, wherein said straight lines are derived by the method of least squares.

4. The method of claim 3, wherein said first duration of the first time windows is significantly shorter than said time interval.

5. The method of claim 1, further comprising the steps of storing the pressure values ocurring during said first time interval in a pressure history, and wherein said current straight line is derived by retrieving pressure values corresponding to said related time window from said pressure history.

6. The method of claim 5, further comprising the step of storing the slopes for the straight lines related to pressure values within said first time interval in a slope history.

7. The method of claim 1, further comprising the steps of determining an amplitude of the wave front from said measured characteristic, comparing said amplitude with a threshold value indicative of noise in the pipeline, and rejecting a time of arrival signal as being caused by an event if said amplitude is below said threshold.

8. The method of claim 7, further comprising the step of determining a magnitude of the event from said amplitude of the wave front.

9. The method of claim 1, further comprising the step of filtering said measured characteristic to filter out static pressure, and to pass frequencies containing wave front arrival time information although said frequencies can contain a significant amount of noise.

10. The method of claim 9, wherein an upper cut-off frequency used for said filtering step is 50 Hz.

11. The method of claim 1, wherein said converting step comprises outputting as said Signal indicative of the time of arrival of said pressure wave at the given position the time of a pressure value related to the time window from which was derived said first current straight line having a slope exceeding said threshold.

12. The method of claim 1, wherein said converting step comprises the steps of:

determining a second time interval between the time of a pressure value related to the time window from which was derived said first current straight line having a slope exceeding said threshold and a time when said wave front has passed by said given position;

selecting within said second time interval a second duration of a time window encompassing significantly fewer of said pressure values than are encompassed by the first duration of a time window, and relating pressure values within said second time interval to respective time windows having said second duration, said second duration being such that a multiplicity of said time windows of said second duration are included within said second time interval;

for each one of the pressure values in said second time interval, approximating a rate of change of fluid pressure with time by a slope of a straight line derived from the pressure values in said time window having said second duration specifically related to respective said each one of the pressure values;

identifying from straight lines derived from said time windows having said second duration a maximum-slope straight line representing the maximum rate of change within said second time interval;

obtaining a reference line from a time window of a preset duration beginning at a designated time prior to the time of said pressure value related to the time window from which was derived the first current straight line having a slope exceeding said threshold;

determining a point of intersection between said maximum-slope straight line and said reference line; and outputting as said signal indicative of the time of arrival of said wave front a time corresponding to said point of intersection.

13. The method of claim 12, wherein said converting step further comprises the steps of:

identifying the time when said wave front has passed by said given position by the slope of a current straight line first falling below another threshold; and defining one limit of said second time interval at occurrence of an oldest pressure value from among the plurality of pressure values in the time window of said first duration having the slope which first falls below said other threshold.

14. The method of claim 13, wherein the step of determining the point of intersection includes extending said reference line forward in time.

15. The method of claim 1, further comprising the step of determining a location in the pipeline at which an event has occurred based on said arrival time at the given location of a wave front due to said event.

16. The method of claim 1, further comprising the step of determining a time of occurrence of an event which has occurred in the pipeline based on said arrival time at the given location of a wave front due to said event.

17. The method of claim 1, further comprising the steps of determining an amplitude of the wave front from said measured characteristic, and determining a magnitude of the event from said amplitude of the wave front.

18. A method for determining at a given position on a pipeline a time of arrival of a pressure wave front travelling through fluid in the pipeline due to an event which causes fluctuation of pressure in such fluid, comprising the steps of:

measuring at the given position a characteristic related to the pressure of said fluid, and deriving therefrom a set of pressure values corresponding to respective discrete times;

selecting a subset of a plurality of said pressure values, and relating the derived pressure values to respective subsets, said subsets being such that a multiplicity thereof are included within said set;

for said pressure values, upon each being derived as a current value, approximating a rate of change of fluid pressure with time by a slope of a current straight line derived from said plurality of pressure values in a subset specifically related to said current value; and converting said measured fluid pressure characteristic to a signal indicative of the time of arrival of said pressure wave front by comparing the slope of the current straight line to a threshold derived from a plurality of slopes obtained for previous subsets, and outputting said signal indicative of the time of arrival of said pressure wave front based upon the slope of a current straight line exceeding said threshold.

19. A method of detecting a wave front indicative of a transient event occurring in a pipeline, comprising the steps of:

(a) measuring a characteristic related to pressure of a fluid in the pipeline with a measuring device positioned at a given point on the pipeline, and outputting analog signals proportional to the pressure;

(b) converting the analog signals into digital signals;

(c) saving the digital signals in a pressure history;

(d) selecting the digital signals received during a short time window within the pressure history and approximating the pressure against time relationship of the received digital signals by a current straight line, a new current straight line being calculated as each pressure measurement is received;

(e) saving the slopes of the current straight lines in a slope history, the slope history being longer in time than the short time window;

(f) deriving a mean and a standard deviation of all of the slopes in the slope history;

(g) detecting when the slope of a new current straight line deviates from said mean of the slopes in the slope history by a deviation of more than a specified multiple of said standard deviation of the slopes in the slope history, and outputting the time of said detected deviation as a first signal indicative of an arrival time of said wave front at said given point;

(h) further selecting signals from the pressure history that fall within a reference time window which precedes said deviation, and approximating the pressure against time relationship of the digital signals in said reference time window by a reference straight line;

(i) finding the end of the transient event by repeating the steps (a) through (f) until the slope of a new current line returns to a designated slope;

(j) deriving a pressure difference between said reference line and said current line the slope of which returned to the designated slope, and outputting said derived pressure difference as a second signal indicative of an amplitude of said wave front; and (k) rejecting said first signal as being caused by an event if said second signal is indicative of an amplitude below a specific threshold selected as indicative of noise.

20. The method of claim 19, further comprising the step of refining the arrival time obtained with step (g) by obtaining a line having the maximum slope of the wave front, finding a point of intersection between said maximum slope line and said reference line, and basing said first signal on said intersection point.

21. A method for determining an arrival time and amplitude of a pressure wave front travelling through fluid in a pipeline due to an event which causes fluctuation of pressure in the fluid, comprising the steps of:

measuring a characteristic related to the pressure of the fluid in the pipeline;

converting measurements of said characteristic to electric signals;

obtaining from said signals an indication of wave front arrival; and responsive to said indication, determining the arrival time and amplitude of the wave front by means of statistical processing.

22. An apparatus for determining at a given position on a pipeline a time of arrival of a pressure wave front travelling through fluid in the pipeline due to an event which causes fluctuation of pressure in the fluid, comprising:

means for measuring at the given position a characteristic related to the pressure of said fluid, and deriving from said measured characteristic pressure values corresponding to respective discrete times occurring during a first interval of time;

means for selecting within said first time interval a first duration of a time window encompassing a plurality of said pressure values, and relating the derived pressure values to respective time windows, said first duration being such that a multiplicity of time windows are included within said first time interval;

means for approximating, for each of said pressure values, upon its being derived as a current value, a rate of change of fluid pressure with time by a slope of a current straight line derived from said plurality of pressure values in the time window related thereto; and means for converting said measured characteristic to a signal indicative of the time of arrival of said pressure wave front by comparing the slope of the current straight line to a first threshold derived from a plurality of slopes obtained for previous time windows within said first time interval, and outputting said signal indicative of the time of arrival of said pressure wave front based upon the slope of a first current straight line exceeding said first threshold.

23. The apparatus of claim 22, wherein the converting means includes means for determining a mean and a standard deviation of the slopes for the straight lines related to pressure values within said first time interval, and setting said first threshold as said mean plus a predetermined multiple of said standard deviation.

24. The apparatus of claim 22, further comprising means for storing the pressure values ocurring during said first time interval in a pressure history, and wherein said current straight line is derived by retrieving pressure values corresponding to said related time window from said pressure history.

25. The apparatus of claim 24, further comprising means for storing the slopes for the straight lines related to pressure values within said first time interval in a slope history.

26. The apparatus of claim 22, further comprising means for determining an amplitude of the wave front from said measured characteristic, comparing said amplitude with a threshold value indicative of noise in the pipeline, and rejecting a time of arrival signal as being caused by an event if said amplitude is below said threshold.

27. The apparatus of claim 26, further comprising means for determining a magnitude of the event from said amplitude of the wave front.

28. The apparatus of claim 22, wherein said converting means comprises means for outputting as said signal indicative of the time of arrival of said pressure wave at the given position the time of a pressure value related to the time window from which was derived said first current straight line having a slope exceeding said first threshold.

29. The apparatus of claim 22, wherein said converting means comprises:

means for determining a second time interval between the time of a pressure value related to the time window from which was derived said first current straight line having a slope exceeding said first threshold and a time when said wave front has passed by said given position;

means for selecting within said second time interval a second duration for a time window encompassing significantly fewer of said pressure values than are encompassed by the first duration of a time window, and relating pressure values within said second time interval to respective time windows having said second duration, said second duration being such that a multiplicity of time windows having said second duration are included within said second time interval;

means for approximating, for each one of the pressure values in said second time interval, a rate of change of fluid pressure with time by a slope of a straight line derived from the pressure values in said time window having said second duration specifically related to respective said each one of the pressure values;

means for identifying from straight lines derived from said time windows having said second duration a maximum-slope straight line representing the maximum rate of change within said second time interval;

means for obtaining a reference line from a time window of a preset duration beginning at a designated time prior to the time of said pressure value related to the time window from which was derived the first current straight line having a slope exceeding said first threshold;

means for determining a point of intersection between said maximum-slope straight line and said reference line; and means for outputting as said signal indicative of the time of arrival of said wave front a time corresponding to said point of intersection.

30. The apparatus of claim 29, wherein said converting means further comprises:

means for identifying the time when said wave front has passed by said given position by the slope of a current straight line first falling below a second threshold; and means for defining one limit of said second time interval at occurrence of an oldest pressure value from among the plurality of pressure values in the time window of said first duration having the slope which first falls below said second threshold.

31. The apparatus of claim 22, further comprising means for determining a location in the pipeline at which an event has occurred based on said arrival time at the given location of a wave front due to said event.

32. The apparatus of claim 22, further comprising means for determining a time of occurrence of an event which has occurred in the pipeline based on said arrival time at the given location of a wave front due to said event.

33. The apparatus of claim 22, further comprising means for determining an amplitude of the wave front from said measured characteristic, and determining a magnitude of the event from said amplitude of the wave front.

34. An apparatus for determining at a given position on a pipeline a time of arrival of a pressure wave front travelling through fluid in the pipeline due to an event which causes fluctuation of pressure in the fluid, comprising:

means for measuring at the given position a characteristic related to the pressure of said fluid, and deriving from said measured characteristic a set of pressure values corresponding to respective discrete times;

means for selecting a subset of a plurality of said pressure values, and relating the derived pressure values to respective subsets, said subsets being such that a multiplicity thereof are included within said set;

means for approximating, for said pressure values, upon each being derived as a current value, a rate of change of fluid pressure with time by a slope of a current straight line derived from said plurality of pressure values in a subset specifically related to said current value; and means for converting said measured fluid pressure characteristic to a signal indicative of the time of arrival of said pressure wave front by comparing the slope of the current straight line to a threshold derived from a plurality of slopes obtained for previous subsets, and outputting said signal indicative of the time of arrival of said pressure wave front based upon the slope of a current straight line exceeding said threshold.

35. An apparatus for detecting a wave front indicative of a transient event occurring in a pipeline, comprising:

(a) means for measuring a characteristic related to pressure of a fluid in the pipeline with a measuring device positioned at a given point on the pipeline, and outputting analog signals proportional to the pressure;

(b) means for converting the analog signals into digital signals;

(c) means for saving the digital signals in a pressure history;

(d) means for selecting the digital signals received during a short time window within the pressure history and approximating the pressure against time relationship of the received digital signals by a current straight line, a new current straight line being calculated as each pressure measurement is received;

(e) means for saving the slopes of the current straight lines in a slope history, the slope history being longer in time than the short time window;

(f) means for deriving a mean and a standard deviation of all of the slopes in the slope history;

(g) means for detecting when the slope of a new current straight line deviates from said mean of the slopes in the slope history by a deviation of more than a specified multiple of said standard deviation of the slopes in the slope history, and outputting the time of said detected deviation as a first signal indicative of an arrival time of said wave front at said given point;

(h) means for further selecting signals from the pressure history that fall within a reference time window which precedes said deviation, and approximating the pressure against time relationship of the digital signals in said reference time window by a reference straight line;

(i) means for finding the end of the transient event by repeating operation of the means (a) through (f) until the slope of a new current line returns to a designated slope;

(j) means for deriving a pressure difference between said reference line and said current line the slope of which returned to the designated slope, and outputting this pressure difference as a second signal indicative of an amplitude of said wave front; and (k) means for rejecting said first signal as being caused by an event if said second signal is indicative of an amplitude below a specific threshold selected as indicative of noise.

36. An apparatus for determining an arrival time and amplitude of a pressure wave front travelling through fluid in a pipeline due to an event which causes fluctuation of pressure in the fluid, comprising:

means for measuring a characteristic related to the pressure of the fluid in the pipeline;

means for converting measurements of said characteristic to electric signals;

means for obtaining from said signals an indication of wave front arrival; and means for, responsive to said indication, determining the arrival time and amplitude of the wave front by means of statistical processing.

37. An apparatus for determining at a given position on a pipeline a time of arrival of a pressure wave front travelling through fluid in the pipeline due to an event which causes fluctuation of pressure in the fluid, comprising:

a transducer at the given position for measuring a characteristic related to the pressure of said fluid, and means for deriving from said measured characteristic pressure values corresponding to respective discrete times occurring during an interval of time;

means for selecting within said time interval a first duration of a time window encompassing a plurality of said pressure values, and relating the derived pressure values to respective time windows, said first duration being such that a multiplicity of time windows are included within said time interval;

a best-fit determination circuit for approximating, for said pressure values, upon each being derived as a current value, a rate of change of fluid pressure with time by a slope of a current straight line derived from said plurality of pressure values in the time window related to said current value; and means for converting said measured characteristic to a signal indicative of the time of arrival of said pressure wave front by comparing the slope of the current straight line to a threshold derived from a plurality of slopes obtained for previous time windows within said time interval, and outputting said signal indicative of the time of arrival of said pressure wave front based upon the slope of a first current straight line exceeding said threshold.

38. An apparatus for determining at a given position on a pipeline a time of arrival of a pressure wave front travelling through fluid in the pipeline due to an event which causes fluctuation of pressure in the fluid, comprising:

a transducer at the given position for measuring a characteristic related to the pressure of said fluid, and means for deriving from said measured characteristic a set of pressure values corresponding to respective discrete times;

means for selecting a subset of a plurality of said pressure values, and relating the derived pressure values to respective subsets, said subsets being such that a multiplicity of said subsets are included within said set;

a best-fit determination circuit for approximating, for said pressure values upon each being derived as a current value, a rate of change of fluid pressure with time by a slope of a current straight line derived from said plurality of pressure values in a subset specifically related to said current value; and means for converting said measured fluid pressure characteristic to a signal indicative of the time of arrival of said pressure wave front by comparing the slope of the current straight line to a threshold derived from a plurality of slopes obtained for previous subsets, and outputting said signal indicative of the time of arrival of said pressure wave front based upon the slope of a current straight line exceeding said threshold.

39. An apparatus for detecting a wave front indicative of a transient event occurring in a pipeline, comprising:

(a) a transducer positioned at a given point on the pipeline for measuring a characteristic related to pressure of a fluid in the pipeline, and for outputting analog signals proportional to the pressure;

(b) an analog to digital converter receiving said analog signals;

(c) a memory for saving the digital signals in a pressure history;

(d) means for selecting the digital signals received during a short time window within the pressure history and approximating the pressure against time relationship of the received digital signals by a current straight line, a new current straight line being calculated as each pressure measurement is received;

(e) a memory for saving the slopes of the current straight lines in a slope history, the slope history being longer in time than the short time window;

(f) means for deriving a mean and a standard deviation of all of the slopes in the slope history;

(g) means for detecting when the slope of a new current straight line deviates from said mean of the slopes in the slope history by a deviation of more than a specified multiple of said standard deviation of the slopes in the slope history, and outputting the time of said detected deviation as a first signal indicative of an arrival time of said wave front at said given point;

(h) means for further selecting signals from the pressure history that fall within a reference time window which precedes said deviation, and approximating the pressure against time relationship of the digital signals in said reference time window by a reference straight line;

(i) means for finding the end of the transient event by repeating operation of elements (a) through (f) until the slope of a new current line returns to a designated slope;

(j) means for deriving a pressure difference between said reference line and said current line the slope of which returned to the designated slope, and outputting said pressure difference as a second signal indicative of an amplitude of said wave front; and (k) means for rejecting said first signal as being caused by an event if said second signal is indicative of an amplitude below a specific threshold selected as indicative of noise.

40. An apparatus for determining an arrival time and amplitude of a pressure wave front travelling through fluid in a pipeline due to an event which causes fluctuation of pressure in the fluid, comprising:

a transducer for measuring a characteristic related to the pressure of the fluid in the pipeline;

means for converting measurements of said characteristic to electric signals;

means for obtaining from said signals an indication of wave front arrival; and means for, responsive to said indication, determining the arrival time and amplitude of the wave front by means of statistical processing.

41. An apparatus for determining at a given position on a pipeline a time of arrival of a pressure wave front travelling through fluid in the pipeline due to an event which causes fluctuation of pressure in the fluid, comprising:

a transducer at the given position on said pipeline responsive to a characteristic related to the pressure of said fluid for producing an analog output;

an analog to digital ("A/D") converter coupled to said transducer for outputting signals corresponding to discrete pressure values;

a first best-fit determination circuit coupled to said A/D converter for, upon a current pressure value being outputted by the A/D converter, forming a current best-fit straight line from a related respective set of said pressure values;

a comparator coupled to said first best-fit determination circuit and to a threshold signal for producing an output signal when said threshold is exceeded by a slope of a current best-fit line;

a time reference; and a detection circuit coupled to said time reference and said comparator for outputting an arrival time signal in response to said output signal of said comparator.

42. The apparatus of claim 41, further comprising a first memory coupled between said A/D converter and said first best-fit determination circuit for storing a specified number of said pressure values, said sets of pressure values being retrieved from said first memory.

43. The apparatus of claim 41, wherein said first memory is a shift register.

44. The apparatus of claim 41, further comprising a second memory coupled to said first best-fit determination circuit for storing slopes from a specified number of said best-fit straight lines; and means for determining a mean and a standard deviation of the slopes stored in said second memory.

45. The apparatus of claim 44, further comprising means coupled to said determining means for producing said threshold from said mean and said standard deviation.

46. The apparatus of claim 44, wherein said second memory is a shift register.

47. The apparatus of claim 42, wherein said detection circuit comprises:

a second best-fit determination circuit coupled to said first memory for forming a best-fit line from other sets of pressure values respectively related to each of designated pressure values between (a) the pressure value related to the first current best-fit line the slope of which exceeded said threshold, and (b) a particular pressure value related to a current best-fit line the slope of which falls below another threshold, each of said other sets of pressure values having significantly fewer pressure values than are included in said sets used for forming the current best-fit lines;

a latch coupled to said second best-fit determination circuit for retaining data on the line having the maximum slope;

a third best-fit determination circuit coupled to said first memory for forming a reference line from a specified number of pressure values the newest of which is before said pressure value related to the first current best-fit line the slope of which exceeded said threshold; and means coupled to said latch and said third best-fit determination circuit for determining an intersection between said reference line and said maximum slope line for outputting said arrival time in accordance with said intersection.

48. The apparatus of claim 47, further comprising means for deriving an amplitude of said wave front from (a) the current best-fit line the slope of which fell below the threshold and (b) said reference line.

49. The apparatus of claim 48, wherein said particular pressure value is an oldest pressure value from among the pressure values in its set.

50. A method for determining at a given position on a pipeline a time of arrival of a pressure wave front travelling through fluid in the pipeline due to an event which causes fluctuation of pressure in the fluid, comprising the steps of:

measuring at the given position a characteristic related to the pressure of said fluid, and deriving from said measured characteristic pressure values corresponding to respective discrete times occurring during an interval of time;

approximating for each discrete time a rate of change of fluid pressure with time by a slope of a straight line derived from a plurality of pressure values occurring earlier;

identifying a time when said rate of change exceeds a threshold;

obtaining a reference straight line from pressure values in a designated period prior to said identified time;

deriving a maximum-slope straight line from pressure values occurring in a period occurring after said identified time;

determining an intersection between said reference straight line and said maximum-slope straight line; and outputting a signal indicative of the time of arrival of said wave front corresponding to said point of intersection.

51. An apparatus for determining at a given position on a pipeline a time of arrival of a pressure wave front travelling through fluid in the pipeline due to an event which causes fluctuation of pressure in the fluid, comprising:

means for measuring at the given position a characteristic related to the pressure of said fluid, and deriving from said measured characteristic pressure values corresponding to respective discrete times occurring during an interval of time;

means for approximating for each discrete time a rate of change of fluid pressure with time by a slope of a straight line derived from a plurality of pressure values occurring earlier;

means for identifying a time when said rate of change exceeds a threshold;

means for obtaining a reference straight line from pressure values in a designated period prior to said identified time;

means for deriving a maximum-slope straight line from pressure values occurring in a period occurring after said identified time;

means for determining an intersection between said reference straight line and said maximum-slope straight line; and means for outputting a signal indicative of the time of arrival of said wave front corresponding to said point of intersection.

52. An apparatus for determining at a given position on a pipeline a time of arrival of a pressure wave front travelling through fluid in the pipeline due to an event which causes fluctuation of pressure in the fluid, comprising:

a transducer for measuring at the given position a characteristic related to the pressure of said fluid, and means for deriving therefrom pressure values corresponding to respective discrete times occurring during an interval of time;

a best-fit determination circuit to approximate for each discrete time a rate of change of fluid pressure with time by a slope of a straight line derived from a plurality of pressure values occurring earlier;

means for identifying a time when said rate of change exceeds a threshold;

a best-fit determination circuit for obtaining a reference straight line from pressure values in a designated period prior to said identified time;

a best-fit determination circuit for deriving a maximum-slope straight line from pressure values occurring in a period occurring after said identified time;

means for determining an intersection between said reference straight line and said maximum-slope straight line; and means for outputting a signal indicative of the time of arrival of said wave front corresponding to said point of intersection.

* * * * *

UNITED STATES PATENT AND TRADEMARK OFFICE
CERTIFICATE OF CORRECTION

PATENT NO. : 5,388,445
DATED : February 14, 1995
INVENTOR(S) : WALTERS et al.

It is certified that error appears in the above-indentified patent and that said Letters Patent is hereby corrected as shown below:

Title page, Item [73] Assignees, line 3,

"Legdeen" should be --Ledeen--

Column 18, line 4 (claim 4), delete "first";

line 5 (claim 4), after "said", insert --first-- line 35 (claim 11, line 2)

"Signal" should be --signal--

Signed and Sealed this

Fourteenth Day of January, 1997

Attest:

BRUCE LEHMAN

Attesting Officer      Commissioner of Patents and Trademarks